United States Patent [19]

Foley

[11] Patent Number: 4,507,452

[45] Date of Patent: Mar. 26, 1985

[54] SILICONE HYDRIDE CONTACT LENS AND POLYMER

[75] Inventor: William M. Foley, Glendale, Calif.

[73] Assignee: John D. McCarry, Anaheim, Calif.

[21] Appl. No.: 587,517

[22] Filed: Mar. 8, 1984

[51] Int. Cl.³ ............................................. C08F 30/08
[52] U.S. Cl. .................... 526/279; 523/107; 525/937; 351/160 H; 351/160 R; 351/168; 556/439
[58] Field of Search ......................... 526/279; 523/107; 525/937; 351/160 H, 160 R, 168; 556/439

[56] References Cited

U.S. PATENT DOCUMENTS

| Re. 31,406 | 10/1983 | Gaylord | 526/279 |
|---|---|---|---|
| 3,377,371 | 4/1968 | Quaal | 556/440 |
| 3,398,017 | 4/1968 | Baurain et al. | 428/264 |
| 4,182,822 | 1/1980 | Chang | 526/279 |
| 4,246,389 | 1/1981 | LeBoeuf | 526/279 |
| 4,433,125 | 2/1984 | Ichinohe | 526/279 |

*Primary Examiner*—Paul R. Michl
*Assistant Examiner*—A. H. Walker
*Attorney, Agent, or Firm*—Hubbard and Stetina

[57] ABSTRACT

Optical contact lenses and silicone hydride polymers therefor are disclosed.

22 Claims, No Drawings

SILICONE HYDRIDE CONTACT LENS AND POLYMER

FIELD OF THE INVENTION

This invention relates to optical contact lenses and materials therefore and, in particular, to silcone polymers and silicone polymer contact lenses.

BACKGROUND

Contact lens technology is nearly three decades old and superficially would seem to be well developed. For example, a great many polymeric materials have been evaluated for potential utility as contact lens material. A very limited number of materials have, however, found their way into contact lenses which are satisfactory in all respects. Notwithstanding a large reservoir of experience, advances in contact lens materials and techniques have come a small steps. Even small steps have been excruciatingly slow and difficult, and polymers and methods which initially appeared very attractive have fallen by the wayside on the long and difficult journey from initial efforts to ultimate user acceptance. The problems are myriad and predictability as to ultimate lens acceptability based upon polymer characteristics is low. It is, for example, difficult at best, and frequently impossible, to predict optical quality, strength and flexibility, resistance to protein build-up, machining and fabrication characteristics, dimensional stability, oxygen permeability, and general biological compatability. The following survey of prior art efforts involving the generic class of compounds of interest, silicones, is not represented to be complete, but includes the disclosures known to and considered by the inventor as being most relevant to the present invention.

Reference is first made to the voluminous literature, in texts, treatises and technical literature which describe siloxyl compounds, commonly referred to as silicones. While the present invention departs from this chemistry in important and substantial ways, insofar as lens technology is concerned, this body of chemistry is fundamental to the present invention.

Merkler, U.S. Pat. No. 2,922,807, discloses disiloxanes of the formula

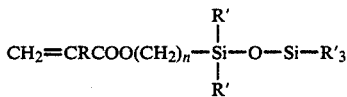

wherein n is an integer from 1 to 4, R is hydrogen or methyl and R is a monovalent hydrocarbon radical free of aliphatic unsaturation.

Merker, U.S. Pat. No. 2,956,044, describes acryloxymethylsilicon polymers of siloxanes, a simple but representative example of which is:

wherein R is hydrogen or methyl and R' is a monovalent hydrocarbon radical. A great many examples of monomers and polymers are given, vinyl polymerizing conditions for forming such polymers is described in some detail and examples are given. The resulting products ranged from liquids, coating agents, adhesives, and bonding agents to thermoplastic and thermoseting resins.

Lamereaux, U.S. Pat. No. 3,197,433, disclosed optically clear organopolysiloxane resins. These, and earlier, resins had been proposed for use in optical contact lenses.

Becker, U.S. Pat. No. 3,228,741, disclosed a corneal contact lens fabricated from transparent silicone rubber. This was what might be called a "soft" contact lens and is said to have had an oxygen permeability higher than conventional lenses extant at that time.

Gaylord, U.S. Pat. No. 3,808,178, and U.S. Pat. No. 4,120,570 discloses oxygen permeable contact lenses fabricated from a copolymer of polysiloxanylalkyl acrylic ester and an alkyl acrylic ester. The polysiloxanylalkyl ester monomer has the structural formula

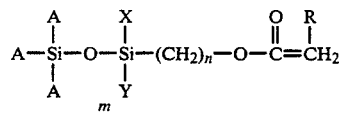

wherein X and Y are $C_1$–$C_5$, phenyl or groups of the structure

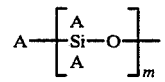

m being an integer from 1 to 5, n being an integer from 1 to 3, and wherein A is selected from $C_1$–$C_5$ alkyl and phenyl groups, and R is methyl or hydrogen. Gaylord does not disclose, or suggest, other than polysiloxanylalkyl esters, as the silicone constituent of his lenses. In particular reference to the present invention, there is neither disclosure nor suggestion of silicone hydride compositions.

Merrill, U.S. Pat. No. 4,099,859, discusses the omnipresent problem of wettability silicone based contact lenses and proposes a rather complex solution to the challenge of incorporating adequate wettability, for comfort and biological compatability, into a silicone lense without giving up the oxygen permeability of the silicone polymer. According to Merrill's method, which is not known to have found widespread use, a thin layer of optically clear hydrophilic polymer is grafted to the silicone lens, using a high dose of ionizing radiation to prepare the silicone base material. One would expect such a lens to be exceedingly expensive and fragile.

Chen, U.S. Pat. No. 4,143,949 discloses a somewhat similar approach to that taken by Merrill, U.S. Pat. No. 4,099,859, in using a plasma glow discharge to prepare a silicone lens to accept a hydrophilic polymer coating.

Mueller and Kliener, U.S. Pat. No. 4,136,250, disclose polysiloxane hydrogels and suggests the use of the same in contact lenses. These materials are also disclosed as capable of acting as drug carrier implant materials. The polymers are essentially hydrophilic olefinic polymer with a minor amount of hydrophobic siloxane.

Tanaka, et al, U.S. Pat. Nos. 4,139,513 and 4,139,692 disclose soft contact lenses composed of a hydrophilic moiety and a methyldi(trimethylsiloxy)sylylpropylglycerol methacrylate. These lenses are said to lie intermediate silicone rubber and conventional hydrophilic contact lenses in wettability and oxygen permeability.

Ellis, U.S. Pat. No. 4,152,508, discloses contact lens materials comprised of particular siloxanyl alkyl esters which are reported to be machinable and have high oxygen permeability.

Deichert, U.S. Pat. Nos. 4,153,641 and 4,189,546, disclose polysiloxane based polymers which are end-capped with activated unsaturated groups which have a polymerizable double or triple bond, typical of which are 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and n-vinyl-2-pyrrolidinone-5-yl.

Chang, U.S. Pat. No. 4,182,822, discloses contact lenses comprised of a polymer formed from, inter alia, polysiloxanylalkyl ester of acrylate or methacrylate, of the class described by Gaylord, supra, copolymerized with N-vinyl pyrrolidone or N,N-dimethyl methacrylamide.

Novicky, U.S. Pat. Nos. 4,216,303, 4,242,483 and 4,248,989 discloses contact lenses comprised of high molecular weight polysiloxanylalkyl esters of acrylic and methacrylic acids, one such polymer including the substituent pentamethyldisiloxane.

LeBoeuf, U.S. Pat. No. 4,246,389, discloses acrylic siloxane based polymers, also containing HEMA and or polyvinyl pyrrolidone which are said to be suitable for use in forming water containing oxygen permeable contact lenses.

While the chemistry, vis-a-vis reaction conditions, of silicone hydrides is known and reasonably well understood, it has not, to the inventor's knowledge, been proposed to use such materials as contact lenses. In particular, the unique characteristics of such contact lenses has not been reported, insofar as is known to the inventor.

SUMMARY OF THE INVENTION

The present invention relates to a novel class of contact lenses comprising polymers resulting from the polymerization or copolymerization of the following:

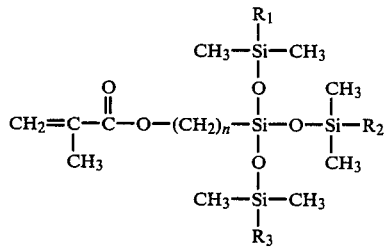

wherein n is a positive integer from 1 to 6 and $R_1$, $R_2$, and $R_3$ are hydrogen or methyl, at least one of $R_1$, $R_2$ and $R_3$ being hydrogen.

In particular, the present invention encompasses contact lenses comprising polymers or copolymers of one or more of the following:

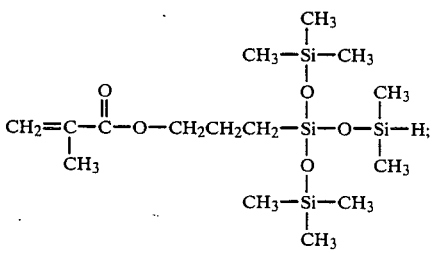

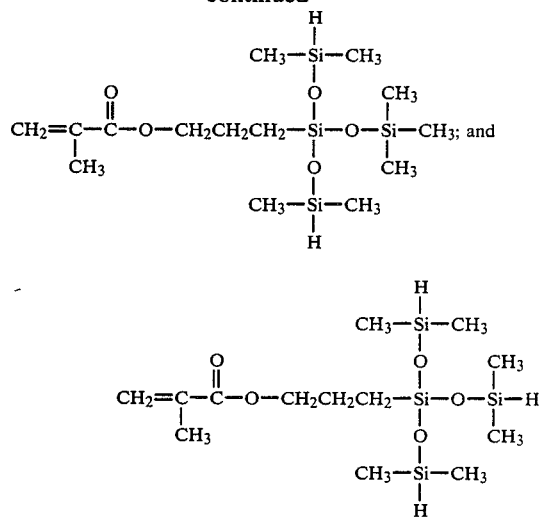

It will be understood in the following discussion that homologs having the silicone hydride moiety will be considered as mere variants of the specific examples given. Likewise, the term "copolymer" is used as a shorthand expression to refer to the product of the polymerization of more than one monomer, including the product of the polymerization of three or more monomers.

In a general sense, the present invention refers to the class of compounds resulting from the polymerization or copolymerization of the following:

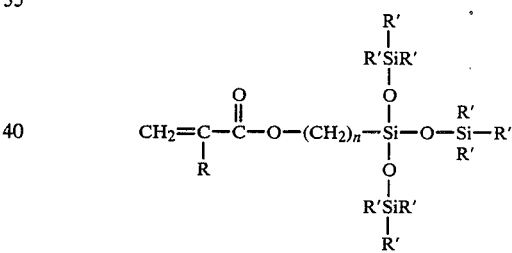

wherein n is a positive integer from 1 to 6, R is hydrogen, methyl or ethyl radical, and R' is hydrogen, or a monovalent hydrocarbon radical free of aliphatic unsaturation, typically methyl, ethyl or phenyl radicals, including substituted phenyl radicals, at least one R' being hydrogen radical.

The present invention includes the class of compounds resulting from the polymerization or copolymerization of:

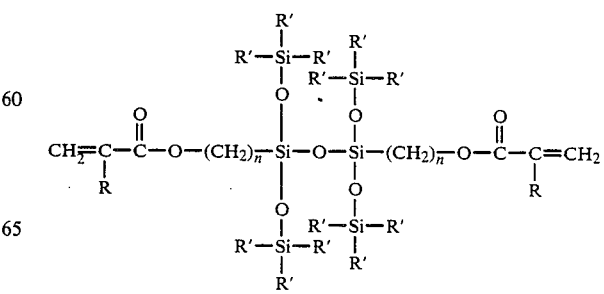

wherein n is a positive integer from 1 to 6, R is hydrogen, methyl or ethyl radical, and R' is hydrogen, or a monovalent hydrocarbon radical free of aliphatic unsaturation, typically methyl, ethyl or phenyl radicals, including substituted phenyl radicals, at least one R' being hydrogen radical.

In a particularly preferred form, the lenses of this invention consists essentially of polymers or copolymers of the above wherein one of R' radical on each silicon is hydrogen.

An important facet of the present invention is the discovery that lenses of the materials described not only have exceedingly high oxygen permeability but, very importantly, have a very reduced tendency for biological contamination. Protein build-up during use, as well as other biological contamination of the lenses is greatly reduced, compared with conventional silicone materials, making the lenses suitable for longer periods of wear and easier to clean.

DESCRIPTION OF THE PREFERRED EMBODIMENT

The preferred embodiment of the invention is described by way of a number of typical examples, none of which are—alone or considered together—limiting of the invention. It is important, in considering the scope of the invention, to distinguish between conventional silicone lenses and lens materials and the silicone hydride materials of this invention. While there are some common elements of chemical reactions, it is to be recognized that neither Gaylord, supra, nor other workers ever contemplated or included silicone hydrides as lens materials. Silicone hydrides, per se, have been reported, but little was known about the physical properties and virtually nothing was known about optical properties of these materials. For example, it was not at all certain that silicone hydrides would be sufficiently transparent to have any useable optical properties. Further, little was reported as to machinabilty, strength or flexibility. Bio-compatability to some extent would be predictable, though still uncertain, from a knowledge of silicone materials, but nothing would suggest that these materials would have the very important attribute of resisting protein accumulation and biological contamination. Many lessons have been learned from experience with silicone lens materials, and other lens materials, the most important of which is that predictability as to important lens characteristics such as comfort, ease of cleaning, capability of being worn for long periods of time without discomfort and/or injury to the eye, resistance to or propensity toward biological contamination, etc. is low and amounts, at best, to poor speculation.

After considerable study, a number of batches of polymer and lenses have been fabricated which have established that the silicone hydride materials are not only potentially suitable for lenses but, quite unexpectedly and happily, have a strong resistance to biological contamination. The following are exemplary formulations:

PURIFICATION OF REAGENTS

Silicone monomers and reagents were dried thoroughly under vacuum over MgSO$_4$. It was found to be of the greatest importance that all moisture and volitiles be removed before polymerization. Failure to do so diminishes the clarity of the lens material and may result in a polymer which is too opaque to be considered a lens material.

EXAMPLE 1

(55% Silicone Monohydride)

Following purification, the following reagents were thoroughly mixed and then cured:

| | |
|---|---|
| Bis(trimethylsiloxy)-(dimethyl siloxy) silyl propyl methacrylate | 22 g |
| Ethylene Dimethacrylate | 1.6 g |
| N—Vinylpyrrolidinone | 1.2 g |
| Methyl Methacrylate | 12.8 g |
| Methacrylic acid | 2.4 g |
| D & C Green dye | <.001 g |
| Vazo-52 (Du Pont (trademark) initiator) | 0.11 g |
| Vazo-33 (Du Pont (trademark) initiator) | 0.11 g |

The curing cycle required 2 hours with a maximum temperature of 103° C., followed by a post-cure of 17.5 hours with the temperature slowly dropping to 83°–85° C.

The resulting polymeric lens blanks were clear and hard with excellent machining properties. Lenses made therefrom were excellent in strength, appearance, clarity, with good wetting and excellent oxygen permeability.

EXAMPLE 2

Following purification, the following reagents were thoroughly mixed and then cured:

| | |
|---|---|
| Bis(trimethylsiloxy)-(dimethyl siloxy) silyl propyl methacrylate | 30%* |
| 1,3 Bis Methacryloxy propyl-1,1,3,3 tetrakis (trimethysiloxy) disiloxane | 15% |
| N—Vinylpyrrolidinone | 3% |
| Methacrylic Acid | 6% |
| Methyl Methacrylate | 46% |
| Vazo-52 (Du Pont (trademark) initiator) | 1% |
| Vazo-33 (Du Pont (trademark) initiator) | 1% |

*All percentages used herein are weight percent.

The above described procedure without significant variation in process variables was followed.

The resulting lens blanks were hard with excellent machining properties. Lenses made therefrom were excellent in strength, appearance, clarity, with good wetting and excellent oxygen permeability.

EXAMPLE 3

(40% Silicone Monohydride)

Following purification, the following reagents were thoroughly mixed and then cured:

| | |
|---|---|
| Bis(trimethylsiloxy)-(dimethyl siloxy) silyl propyl methacrylate | 40 g |
| Ethylene Dimethacrylate | 4.35 g |
| N—Vinylpyrrolidinone | 3 g |
| Methacrylic Acid | 6 g |
| D & C Green dye | <.001 g |
| Vazo-52 (Du Pont (trademark) initiator) | 0.22 g |
| Vazo-33 (Du Pont (trademark) initiator) | 0.22 g |

The curing cycle required 2 hours with a maximum temperature of 104° C., followed by a post-cure of 16.8 hours with the temperature slowly dropping to 85°–86° C.

The resulting polymeric lens blanks were clear and hard with excellent machining properties. Lenses made therefrom were excellent in strength, appearance, clarity, with good wetting and excellent oxygen permeability.

EXAMPLE 4

(40% Silicone Monohydride—5% MEMA)

Following purification, the following reagents were thoroughly mixed and then cured:

| | |
|---|---|
| Bis(trimethylsiloxy)-(dimethyl siloxy) silyl propyl methacrylate | 20 g |
| Methoxyethyl Methacrylate | 2.5 g |
| Ethylene Dimethacrylate | 2 g |
| N—Vinylpyrrolidinone | 1 g |
| Methacrylic Acid | 1.5 g |
| Methyl Methacrylate | 23 g |
| D & C Green dye | <.002 g |
| Vazo-52 (Du Pont (trademark) initiator) | 0.11 g |
| Vazo-33 (Du Pont (trademark) initiator) | 0.11 g |

The curing cycle required 2 hours with a maximum temperature of 102° C., followed by a post-cure of 16.5 hours with the temperature slowly dropping to 85° C.

The resulting polymeric lens blanks were clear and hard with excellent machining properties. Lenses made therefrom were excellent in strength, appearance, clarity, with good wetting and excellent oxygen permeability.

EXAMPLE 5

(30% Silicone Monohydride—15% Disiloxane)

Following purification, the following reagents were thoroughly mixed and then cured:

| | |
|---|---|
| Bis(trimethylsiloxy)-(dimethyl siloxy) silyl propyl methacrylate | 6 g |
| Bis(methacryloxy propyl)-tetramethyl disiloxane | 3 g |
| N—Vinylpyrrolidinone | 0.6 g |
| Methacrylic Acid | 1.2 g |
| Methyl Methacrylate | 9.2 g |
| D & C Green dye | <.001 g |
| Vazo-52 (Du Pont (trademark) initiator) | 0.08 g |
| Vazo-33 (Du Pont (trademark) initiator) | 0.08 g |

The curing cycle required 1.8 hours with a maximum temperature of 104° C., followed by a post-cure of 16.3 hours with the temperature slowly dropping to 87°–89° C.

The resulting polymeric lens blanks were clear and hard with excellent machining properties. Lenses made therefrom were excellent in strength, appearance, clarity, with good wetting and excellent oxygen permeability.

EXAMPLE 6

(40% Silicone Trishydride)

Following purification, the following reagents were thoroughly mixed and then cured:

| | |
|---|---|
| Tris(dimethylsiloxy)-silyl propyl methacrylate | 12 g |
| Ethylene Dimethacrylate | 1.2 g |
| N—Vinylpyrrolidinone | 0.9 g |
| Methacrylic Acid | 1.8 g |
| Methyl Methacrylate | 14.1 g |
| D & C Green dye | <.002 g |
| Vazo-52 (Du Pont (trademark) initiator) | 0.07 g |
| Vazo-33 (Du Pont (trademark) initiator) | 0.07 g |

The curing cycle required 2 hours with a maximum temperature of 102° C., followed by a post-cure of 17.5 hours with the temperature slowly dropping to 81° C.

The resulting polymeric lens blanks were clear and hard with excellent machining properties. Lenses made therefrom were excellent in strength, appearance, clarity, with good wetting and excellent oxygen permeability.

EXAMPLE 7

(35% Silicone Trishydride—5% MEMA)

Following purification, the following reagents were thoroughly mixed and then cured:

| | |
|---|---|
| Tris(dimethylsiloxy)-silyl propyl methacrylate | 14 g |
| Ethylene dimethacrylate | 2 g |
| Methoxyethyl Methacrylate | 0.8 g |
| N—Vinylpyrrolidinone | 1.2 g |
| Methacrylic Acid | 1.2 g |
| Methyl Methacrylate | 20.4 g |
| D & C Green dye | <.002 g |
| Vazo-52 (Du Pont (trademark) initiator) | 0.11 g |
| Vazo-33 (Du Pont (trademark) initiator) | 0.11 g |

The curing cycle required 2 hours with a maximum temperature of 102° C., followed by a post-cure of 17.3 hours with the temperature slowly dropping to 81°–82° C.

The resulting polymeric lens blanks were clear and hard with excellent machining properties. Lenses made therefrom were excellent in strength, appearance, clarity, with good wetting and excellent oxygen permeability.

EXAMPLE 8

(30% Silicone Trishydride—15% Bishydride)

Following purification, the following reagents were thoroughly mixed and then cured:

| | |
|---|---|
| Tris(dimethylsiloxy)-silyl propyl methacrylate | 14 g |
| Ethylene Dimethacrylate | 1.6 g |
| Methoxyethyl Methacrylate | 2 g |
| N—Vinylpyrrolidinone | 0.8 g |
| Methacrylic Acid | 1.2 g |
| Methyl Methacrylate | 20.4 g |
| D & C Green dye | <.002 g |
| Vazo-52 (Du Pont (trademark) initiator) | 0.11 g |
| Vazo-33 (Du Pont (trademark) initiator) | 0.11 g |

The curing cycle required 2 hours with a maximum temperature of 102° C., followed by a post-cure of 17.3 hours with the temperature slowly dropping to 81°–82° C.

The resulting polymeric lens blanks were clear and hard with excellent machining properties. Lenses made therefrom were excellent in strength, appearance, clarity, with good wetting and excellent oxygen permeability.

The foregoing examples establish the polymer materials of this invention as contact lens materials, and the lenses which consist essentially of the materials of this invention as being of superior quality, having very high oxygen permeability and low receptivity to protein and other biological contamination.

What is claimed is:

1. Contact lenses comprising polymers resulting from the polymerization or copolymerization of:

$$CH_2=C(CH_3)-C(O)-O-(CH_2)_n-Si(O-Si(CH_3)_2R_2)(O-Si(CH_3)_2R_3)-O-Si(CH_3)_2R_1$$

wherein n is a positive integer from 1 to 6 and $R_1$, $R_2$, and $R_3$ are hydrogen or methyl, at least one of $R_1$, $R_2$ and $R_3$ being hydrogen.

2. Contact lenses comprising polymers or copolymers of one or more of the following:

$$CH_2=C(CH_3)-C(O)-O-CH_2CH_2CH_2-Si[O-Si(CH_3)_3]_2-O-Si(CH_3)_2H;$$

$$CH_2=C(CH_3)-C(O)-O-CH_2CH_2CH_2-Si[O-Si(CH_3)_2H]_2-O-Si(CH_3)_3; \text{ and}$$

$$CH_2=C(CH_3)-C(O)-O-CH_2CH_2CH_2-Si[O-Si(CH_3)_2H]_3$$

3. A contact lens comprising polymer resulting from the polymerization or copolymerization of:

$$CH_2=C(R)-C(O)-O-(CH_2)_n-Si(O-SiR'_3)_2-O-SiR'_2R'$$

wherein n is a positive integer from 1 to 6, R is hydrogen, methyl or ethyl radical, and R' is hydrogen, or a monovalent hydrocarbon radical free of aliphatic unsaturation, typically methyl, ethyl or phenyl radicals, including substituted phenyl radicals, at least one R' being hydrogen radical.

4. A contact lens comprising a polymer resulting from the polymerization or copolymerization of:

$$CH_2=C(R)-C(O)-O-(CH_2)_n-Si(O-SiR'_3)_2-O-Si[(CH_2)_n-O-C(O)-C(R)=CH_2](O-SiR'_3)$$

wherein n is a positive integer from 1 to 6, R is hydrogen, methyl or ethyl radical, and R' is hydrogen, or a monovalent hydrocarbon radical free of aliphatic unsaturation, typically methyl, ethyl or phenyl radicals, including substituted phenyl radicals, at least one R' being hydrogen radical.

5. A contact lens consisting essentially of a polymer resulting from the polymerization and curing of:
   Bis(trimethylsiloxy)-(dimethyl siloxy)silyl propyl methacrylate,
   Ethylene Dimethacrylate,
   N-Vinylpyrrolidinone,
   Methyl Methacrylate, and
   Methacrylic acid.

6. A contact lens consisting essentially of a polymer resulting from the polymerization and curing of:
   Bis(trimethylsiloxy)-(dimethyl siloxy)silyl propyl methacrylate,
   1,3 Bis Methacryloxy propyl-1,1,3,3 tetrikis(trimethylsiloxy)disiloxane,
   N-vinylpyrrolidinone,
   Methacrylic Acid, and
   Methyl methacrylate.

7. A contact lens consisting essentially of a polymer resulting from the polymerization and curing of:
   Bis(tyrimethlsiloxy)-(dimethyl siloxy)silyl propyl methacrylate,
   Ethylene Dimethacrylate,
   N-Vinylpyrrolidinone, and
   Methacrylic acid.

8. A contact lens consisting essentially of a polymer resulting from the polymerization and curing of:
   Bis(trimethylsiloxy)-(dimethyl siloxy)silyl propyl methacrylate,
   Methoxyethyl Methacrylate,
   Ethylene Dimethacrylate,
   N-Vinylpyrrolidinone,
   Methacrylic Acid, and
   Methyl Methacrylate.

9. A contact lens consisting essentially of a polymer resulting from the polymerization and curing of:
   Bis(trimethylsiloxy)-(dimethyl siloxy)silyl propyl methacrylate,
   Bis(methacryloxy propyl)-tetramethyl disiloxane,
   N-Vinylpyrrolidinone,
   Methacrylic Acid, and
   Methyl Methacrylate.

10. A contact lens consisting essentially of a polymer resulting from the polymerization and curing of:
    Tris(dimethylsiloxy)-silyl propyl methacrylate, Ethylene Dimethacrylate,
N-Vinylpyrrolidinone,
Methacrylic Acid, and
Methyl Methacrylate.

11. A contact lens consisting essentially of a polymer resulting from the polymerization and curing of:
Tris(dimethylsiloxy)-silyl propyl methacrylate,
Ethylene dimethacrylate,
Methoxyethyl Methacrylate,
N-Vinylpyrrolidinone,
Methacrylic Acid, and
Methyl Methacrylate.

12. A contact lens consisting essentially of a polymer resulting from the polymerization and curing of:
Tris(dimethylsiloxy)-silyl propyl methacrylate,
Ethylene Dimethacrylate,
Methoxyethyl Methacrylate,
N-Vinylpyrrolidinone,
Methacrylic Acid, and
Methyl Methacrylate.

13. A contact lens comprising a polymer resulting from the polymerization and curing of Bis(trimethylsiloxy)-(dimethyl siloxy)silyl propyl methacrylate, with a monomer selected from the group consisting of Ethylene Dimethacrylate, N-Vinylpyrrolidinone, Methyl Methacrylate, and Methacrylic acid.

14. A contact lens comprising a polymer resulting from the polymerization and curing of: Bis(trimethylsiloxy)-(dimethyl siloxy)silyl propyl methacrylate, and 1,3 Bis Methacryloxy propyl-1,1,3,3 tetrakis(trimethysiloxy)disiloxane, with an acrylic monomer.

15. A contact lens comprising a polymer resulting from the polymerization and curing of Bis(trimethylsiloxy)-(dimethyl siloxy)silyl propyl methacrylate and an acrylic monomer.

16. A contact lens comprising a polymer resulting from the polymerization and curing of Bis(trimethylsiloxy)-(dimethyl siloxy)silyl propyl methacrylate, N-Vinylpyrrolidinone and an acrylic monomer.

17. A contact lens comprising a polymer resulting from the polymerization and curing of Bis(trimethylsiloxy)-(dimethyl siloxy)silyl propyl methacrylate, Bis(methacryloxy propyl)-tetramethyl disiloxane and an acrylic monomer.

18. A contact lens comprising a polymer resulting from the polymerization and curing of Bis(trimethylsiloxy)-(dimethyl siloxy)silyl propyl methacrylate, Bis(methacryloxy propyl)-tetramethyl disiloxane N-Vinylpyrrolidinone, and an acrylic monomer.

19. A contact lens comprising a polymer resulting from the polymerization and curing of Tris(dimethylsiloxy)-silyl propyl methacrylate and an acrylic monomer.

20. A contact lens comprising a polymer resulting from the polymerization and curing of Tris(dimethylsiloxy)-silyl propyl methacrylate, N-vinylpyrrolidinone and an acrylic monomer.

21. A contact lens comprising a polymer resulting from the polymerization and curing of Tris(dimethylsiloxy)-silyl propyl methacrylate and one or more monomers selected from the group consisting of Ethylene dimethacrylate, Methoxyethyl Methacrylate, N-Vinylpyrrolidinone, Methacrylic Acid, and Methyl Methacrylate.

22. A contact lens comprising a polymer resulting from the polymerization and curing of one or more monomers selected from the group consisting of Tris(dimethylsiloxy)-silyl propyl methacrylate, Bis(trimethylsiloxy)-(dimethyl siloxy)silyl propyl methacrylate and Bis(methacryloxy propyl)-tetramethyl disiloxane.

* * * * *